US012443226B2

(12) United States Patent
Mertel et al.

(10) Patent No.: US 12,443,226 B2
(45) Date of Patent: Oct. 14, 2025

(54) MOBILE COMMAND AND CONTROL CENTERS AND BOXES THEREFORE (71) Applicant: Modine LLC, Racine, WI (US)

(72) Inventors: Jacob Mertel, Plano, TX (US); Taylor Monnig, Plano, TX (US); Hudson Young, Plano, TX (US); Matthew Jones, Plano, TX (US); Matt Martin, Plano, TX (US); Wyatt Sitz, Plano, TX (US); Matt Haley, Plano, TX (US)

(73) Assignee: Modine, LLC, Racine, WI (US)

( * ) Notice: Subject to any disclaimer, the term of this patent is extended or adjusted under 35 U.S.C. 154(b) by 151 days.

(21) Appl. No.: 18/292,650

(22) PCT Filed: Jul. 29, 2022

(86) PCT No.: PCT/US2022/038847
§ 371 (c)(1),
(2) Date: Jan. 26, 2024

(87) PCT Pub. No.: WO2023/009804
PCT Pub. Date: Feb. 2, 2023

(65) Prior Publication Data
US 2025/0085742 A1 Mar. 13, 2025

Related U.S. Application Data (60) Provisional application No. 63/226,854, filed on Jul. 29, 2021.

(51) Int. Cl.
G06F 1/16 (2006.01)
G08B 7/06 (2006.01)
H04B 1/3888 (2015.01)

(52) U.S. Cl.
CPC .......... *G06F 1/1628* (2013.01); *G06F 1/1632* (2013.01); *G08B 7/06* (2013.01); *H04B 1/3888* (2013.01)

(58) Field of Classification Search
CPC combination set(s) only.
See application file for complete search history.

(56) References Cited

U.S. PATENT DOCUMENTS 5,774,331 A * 6/1998 Sach ............... G06F 1/1616
361/679.55
5,872,557 A * 2/1999 Wiemer ............. G06F 1/182
345/905

(Continued)

OTHER PUBLICATIONS

International Preliminary Report on Patentability for Application No. PCT/US2022/038847 dated Jan. 18, 2024 (5 pages).

(Continued)

Primary Examiner — Lisa Lea-Edmonds
(74) Attorney, Agent, or Firm — Michael Best & Friedrich LLP (57) ABSTRACT The instant disclosure pertains to a portable command and control center system. The system may comprise a waterproof, hardened, latchable two-piece plastic shell and command and control components housed within the two-piece plastic shell. The command and control components may comprise an uninterruptable power supply configured to power the system and at least two monitors. The two monitors may be configured to pop up into a useful position when the two-piece plastic shell is unlatched. Advantageously, the system is compact and lightweight so that it may be transported and carried by one person.

12 Claims, 6 Drawing Sheets (56) References Cited

U.S. PATENT DOCUMENTS

| | | | | |
|---|---|---|---|---|
| 10,178,792 | B2* | 1/2019 | Meinhart | H05K 5/023 |
| 10,645,603 | B2* | 5/2020 | Chalmer | G08G 5/32 |
| RE49,124 | E* | 7/2022 | Arnouse | G06F 1/1658 |
| 11,507,142 | B1* | 11/2022 | Davis | G06F 1/1656 |
| 11,698,661 | B2* | 7/2023 | Martin | A45C 13/02 |
| | | | | 361/679.09 |
| 12,079,035 | B2* | 9/2024 | Davis | G06F 1/1683 |
| 12,218,700 | B2* | 2/2025 | Stewart | H04B 1/3827 |
| 2005/0162824 | A1 | 7/2005 | Thompson | |
| 2005/0258971 | A1 | 11/2005 | Greenstein et al. | |
| 2008/0283114 | A1* | 11/2008 | Gray | H02S 40/42 |
| | | | | 136/245 |
| 2009/0102744 | A1 | 4/2009 | Ram | |
| 2009/0323568 | A1* | 12/2009 | Hoffmann | H04W 84/10 |
| | | | | 370/310 |
| 2015/0014214 | A1 | 1/2015 | Richardson | |
| 2019/0281483 | A1* | 9/2019 | Chalmer | H04W 76/10 |
| 2023/0305597 | A1* | 9/2023 | Davis | A45C 11/003 |
| 2025/0085742 | A1* | 3/2025 | Mertel | H04B 1/3888 |

OTHER PUBLICATIONS

International Search Report for Application No. PCT/US2022/038847 dated Oct. 25, 2022 (5 pages).

* cited by examiner

MOBILE COMMAND AND CONTROL CENTERS AND BOXES THEREFORE

CROSS REFERENCE OF RELATED APPLICATIONS

This application is a U.S. National Phase application of International Patent Application No. PCT/US2022/038847 filed Jul. 29, 2022, which claims priority from U.S. Provisional Application No. 63/226,854, filed on Jul. 29, 2021, the entire disclosures of which are incorporated herein in their entirety.

FIELD OF THE INVENTION

The present inventions are directed to mobile command and control centers and components and boxes for mobile command and control centers.

BACKGROUND

Command and control centers or mission control are used in many fields to centralize the monitoring, control, and command of an organization's overall operations or one or more specific operations or missions. Fields that employ such a command and control center are various and include, for example, military, offshore oil and gas, disaster recovery, emergency alert and 911 services, weather management, and/or traffic control.

SUMMARY

Typically, command and control centers comprise a stationary situation room with various equipment such as monitors and computers. Thus, users are unfortunately tethered to offices and infrastructure. It would be desirable if a command and control system could be made to be mobile and allow for rapid deployment and re-deployment so that a user was not tied to a specific geographical location. In this manner, one or more users could have a command and control center which is closer to the activities and/or operations being controlled and/or move the command and control center in anticipation of an adverse event, e.g., weather, military, or otherwise. It would further be advantageous if such a command and control center could be transported by a single user, was compact, was lightweight, and was built for transport and operation in harsh conditions. It would further be desirable if such a center offered capabilities beyond command and control such as, for example, communications, computing, and cyber defense.

Advantageously, the instant application meets one or more up to all of the aforementioned needs and may offer even additional advantages. In one embodiment the application pertains to a portable command and control center system. The system may comprise a waterproof, hardened, latchable two-piece plastic shell and command and control components housed within the two-piece plastic shell. The command and control components may comprise an uninterruptable power supply configured to power the system and at least two monitors. The at least two monitors may be configured to pop up into a useful position when the two-piece plastic shell is unlatched. Advantageously, the system is compact and lightweight so that it may be transported and carried by one person. Further features, benefits, and embodiments are described below.

In some aspects, the techniques described herein relate to a system, method and apparatus for a portable command and control system. The exemplary system, method and apparatus can comprise a portable command and control center system including: a waterproof, hardened, latchable two-piece plastic shell; and command and control components housed within the two-piece plastic shell; wherein the command and control components include: an uninterruptable power supply configured to power the system; at least two monitors that are configured to pop up into a position when the two-piece plastic shell is unlatched; a sensor for detecting an electromagnetic pulse; and processing circuitry for receiving a signal form the sensor, wherein the processing circuitry is configured to generate an alarm when the signal deviates from a threshold value.

In some aspects, the techniques described herein relate to a system, further including a personal computer. In some aspects, the techniques described herein relate to a system, further including a docking station for connecting one or more laptop computers to the system.

In some aspects, the techniques described herein relate to a system, further including an alarm device, wherein the alarm device is a speaker or a light. In some aspects, the techniques described herein relate to a system, wherein generating the alarm will cause the alarm device to make a sound or illuminate. In some aspects, the techniques described herein relate to a system, wherein the processing circuitry is configured to determine a strength, a frequency or a direction of the electromagnetic pulse.

In some aspects, the techniques described herein relate to a system, further including a conductive color over the waterproof, hardened, latchable two-piece plastic shell. In some aspects, the techniques described herein relate to a system, further including a metallic layer over or within the waterproof, hardened, latchable two-piece plastic shell. In some aspects, the techniques described herein relate to a system, further including a door on the waterproof, hardened, latchable two-piece plastic shell.

In some aspects, the techniques described herein relate to a system, wherein the door is configured to operate in two modes of operations, the first mode being open and the second mode being closed. In some aspects, the techniques described herein relate to a system, wherein in the open mode, electromagnetic waves can enter and exit the waterproof, hardened, latchable two-piece plastic shell. In some aspects, the techniques described herein relate to a system, wherein the at least two monitors are attached to a mount configured to provide for movement of the at least two monitors in at least two degrees of freedom.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention.

The present disclosure relates to a portable or mobile command and control center system (hereinafter "PCC system" or "system"). The housings for the systems described herein may vary depending upon the environments to which the system will be exposed, how the system will be employed, the specific components of the system, and other factors. While other housings may be useful, the systems herein typically comprise a waterproof, hardened, latchable two-piece plastic shell for securely housing the command and control system components. The specific configuration of the latches, shape, and material may vary. Typically, the latches on the two-piece shell are typically lockable for security. In some embodiments, the shape and material of the housing and other components are selected so that the system may be hand carried, set-up, operated, and re-deployed by a single, average size human.

Figure 1:
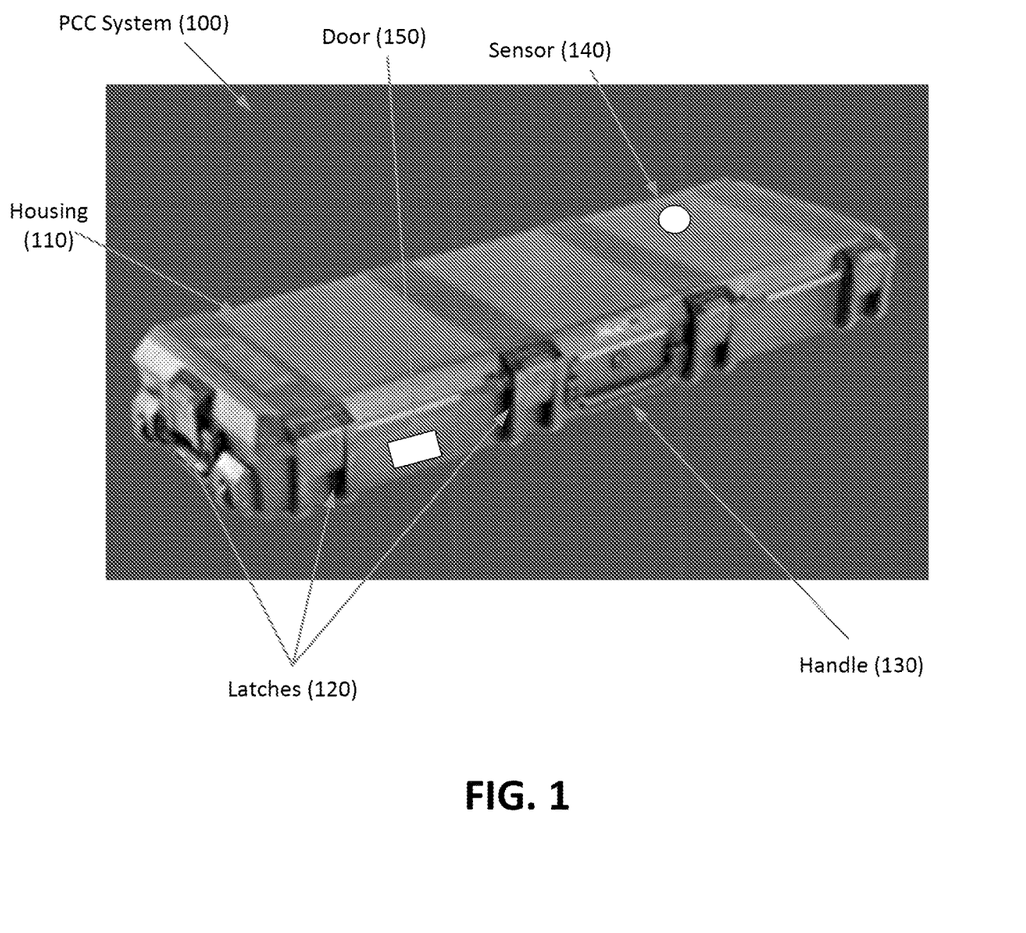
FIG. 1 shows an exemplary housing for a portable command and control system (or PCC system) according to an exemplary embodiment of the present disclosure.

FIG. 1 shows an exemplary housing 110 for a portable command and control system 100 (or PCC system 100) according to an exemplary embodiment of the present disclosure. In this example embodiment, the housing 110 can include a two-piece plastic shell. In the present example of FIG. 1, the housing 110 is displayed in a closed position. The housing 110 can comprise multiple latches 120 and a handle 130. The latches 120 and/or the handle 130 can enable a user to transport and utilize the PCC system 100.

In certain applications, e.g., military applications where the equipment can be subject to electromagnetic pluses by the enemy or oil field applications where the equipment can be left outside exposed to the element for extensive periods of time, it can be beneficial if the housing 110 can protect against electromagnetic pluses or water damage. In one example embodiment, the housing 110 of the PCC system 100 can be waterproof. In this example, all the parts of the housing 110 that can be opened or allow for leakage of water can be sealed using, e.g., an o-ring or other sealing material (See, e.g., FIG. 2, the sealing material 222).

In one example embodiment, the housing 110 of the PCC system 100 can protect and/or shield the equipment inside the housing 110 from electromagnetic pluses and/or lightening. In this example embodiment, electromagnetic shielding can be achieved through metallic screens or metal enclosures, e.g., creating a Faraday Cage. Electromagnetic shielding can prevent electromagnetic waves from impacting sensitive electronics inside the housing 110. In one example, electromagnetic shielding can be achieved by, e.g., including a metallic layer inside, within or outside the housing 110. For example, the housing 110 can have two layers, an internal layer and an external layer, and the metallic layer can be in between the internal and external layers. In another example, the housing 110 can include only one layer and the metallic layers can be on either side of the one layer. In one example, the electromagnetic shielding can be achieved by painting metallic or conductive color over or within the housing 110. For example, the metallic or conductive color can be painted over the external layer (e.g., on either side) or over the internal layer (e.g., on either side). In another example, the housing 110 can include only one layer and the metallic or conductive color can be painted on either side of the housing 110.

In some embodiments, the interior of the housing 110 such as the interior of the two-piece shell may comprise modular mounts so that components may be mounted to the interior of the housing. In this manner, components such as external equipment, peripheral interfaces, antenna connectors, e.g., Bayonet Neill-Concelman (BNC), ethernet connectors, e.g., RJ45 or milspec, USB, fans for cooling the equipment, fan controllers, and/or other components, can be mounted to the interior of the housing 110. The modular mounts may comprise any convenient mechanism for attaching the desired components and may vary depending upon the nature of the component, size, weight, etc. In one specific embodiment, modular mounts comprise two or more rails across one or more sides of the interior of the housing 110. In this example, the modular mounts allow for mounting of components using velcro or similar tongue and groove type fasteners.

In one example embodiment, the PCC system 100 can include a sensor for detecting the strength, frequency and direction of electromagnetic attacks. Oftentimes, electromagnetic pulses or attacks are not discernable to human beings. As such, electronic equipment may receive or be subject to an electromagnetic attack and the user may not even know this. The user may carry the PCC system 100 and believe that it will function properly, but because the equipment has been attacked, it may not function as intended. Additionally, knowledge about the occurrence of any such attacks can be useful for the user because these attacks are not perceivable by users. As such, it may be beneficial to place a sensor on the housing 110 for detecting such attacks and sounding or displaying an alarm if any such attack is detected.

FIG. 1 shows an example sensor 140 according to an example embodiment of the present disclosure. Sensor 140 can be placed on the housing 110. In other examples, the sensor 140 can be placed inside the housing 140. The sensor 140 can be electronically coupled to a processing circuitry (See. e.g., processing circuitry 223 in FIG. 2). The processing circuitry 223 can comprise a processor, a memory and a transceiver. The sensor 140 can receive electromagnetic waves and issue a signal to the processor when electromagnetic waves are received. The processor can analyze the signal, and if, e.g., the signal deviates from a threshold, issue an alarm. For example, if the processor determines that the strength, frequency and/or direction of the electromagnetic waves deviates from a threshold value, the processor can instruct a speaker to make a sound or a light bulb to turn on.

In certain applications, it may be desirable to operate the PCC system and transmit electromagnetic waves when the housing 110 is closed. In one example embodiment, it may be desirable to operate the PCC system 100 in two modes of operation. In a first mode of operation, the housing 110 can be shielded from electromagnetic waves. In a second mode of operation, a door 150 of the housing 150 can be opened and allow for receipt and transmission of the electromagnetic waves. In this example, once the door 150 is opened, the housing 150 is not completely shielded, and as such, the electromagnetic waves can pass through the door 150.

Figure 2:
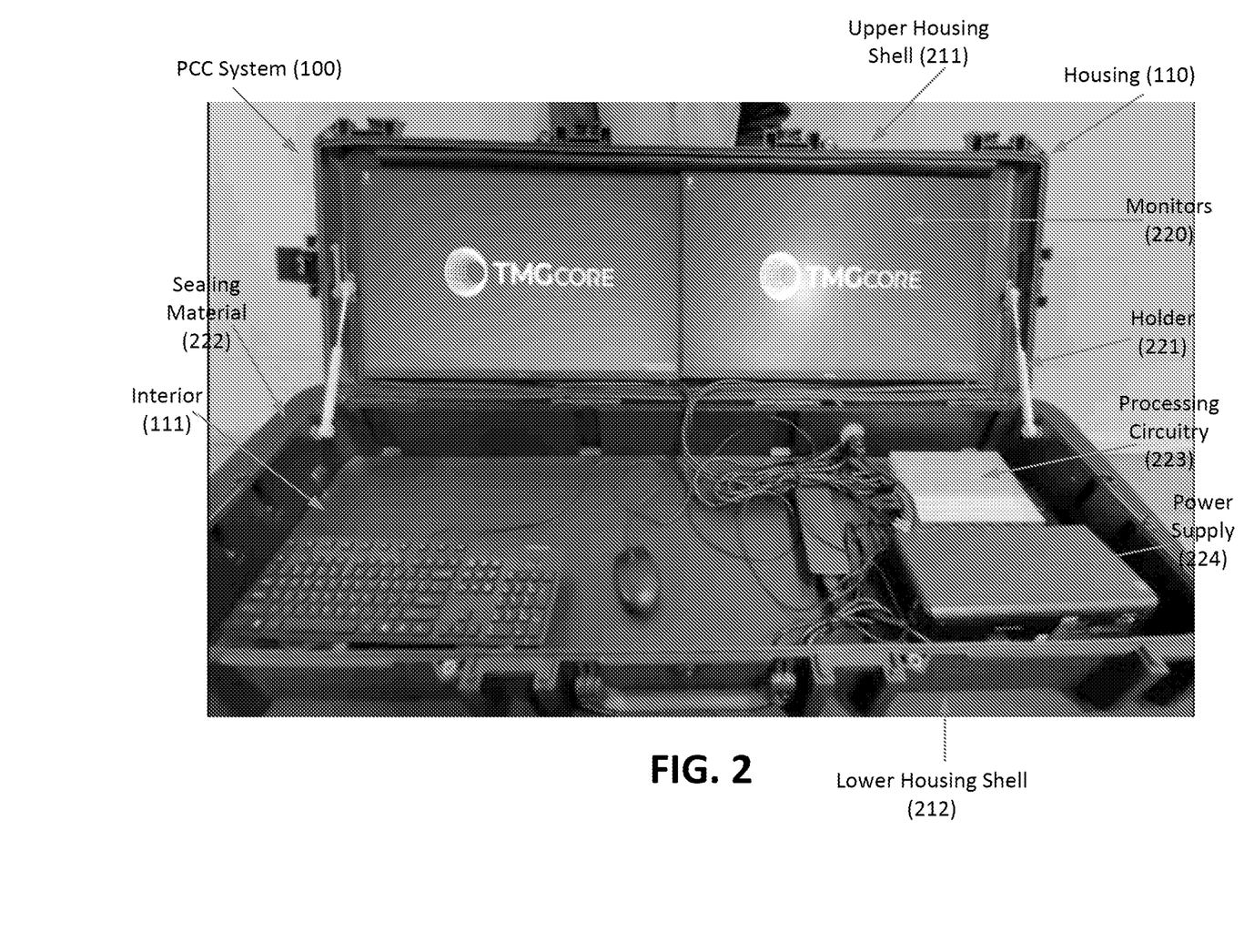
FIG. 2 shows an exemplary housing of the PCC system according to an example embodiment of the present disclosure.

FIG. 2 shows an exemplary housing 110 of the PCC system 100 according to an example embodiment of the present disclosure. In the example of FIG. 2, the housing 110 can be a two-piece plastic shell (e.g., an upper housing shell 211 and a lower housing shell 212) and is displayed in an open position. The housing 110 can include a metallic layer, e.g., aluminum or iron, in between an inner layer and an outer layer of the upper housing shell 211 or the lower housing shell 212. In this example, various components are installed within the housing 110. For example, two monitors 220 can be attached to or mounted integral with the interior of the upper housing shell 211. The upper housing shell 211 and the lower housing shell 212 can be connected with hinges to allow for closing and opening the housing 110. In one example, a holder 221 (or retractable jack) can be used in the housing 110 to hold the upper housing shell 211 and the lower housing shell 212 in an open position (or closed position as shown in FIG. 1).

Various command and control components may be housed within the housing 110. Such components may vary but may include (1) at least one or more of an uninterruptable power supply 224 (or UPS 224) configured to power the system and (2) at least two monitors 220 that are configured to pop up into a useful position when the housing 110 such as the two-piece plastic shell is opened or unlatched. The UPS 224 may be configured to power at least the entire system and may power additional components in some embodiments. The UPS 224 may be commercially available or specialized for a given system.

The power is typically supplied by any convenient means. In some embodiments the power may be supplied by one or more batteries and the type of battery is not particularly limited. In some embodiments the one or more batteries may comprise nickel cadmium (NiCad), nickel metal hydride (NiMH), lithium ion (Li-ion), and combinations thereof. In other embodiments the power may be supplied by an electrical outlet or alternatively solar or other renewable sources. The UPS 224 may be configured such that it works to power the system when the housing is or plastic shell is in the open or closed position. In this manner other devices may be charged with the UPS while the system is being transported.

As described above, the equipment within the CCP system 100 can comprise at least two monitors 220. The type or types and size of monitors are not particularly limited and may vary depending upon the environment in which the system is to be employed. In some embodiments the monitors are configured (via hinges or another manner) in the interior of the housing 110 so the monitors pop up into a useful position when the housing such as the two-piece plastic shell is opened or unlatched. For example, the monitors 220 can be attached to a movable mount, which is configured to allow the monitors 220 to be reoriented.

Other components may be employed in the system as desired. In some embodiments, the system may comprise a personal computer such as a laptop. Additionally or alternatively, systems may comprise a docking station for connecting one or more laptop computers to the system. Other optional components include, but are not limited to, USB or Ethernet connections, mouse, keyboard, a graphic processing unit (GPU) such as a battlefield accelerator for artificial intelligence or machine learning, tactical radios, switches such as, for example, kvm switch, and other peripherals.

In some embodiments, a command and control system may be equipped with the capability for additional communication such that a system may serve as a hub and be connected to one or more other mobile command and control systems. In other embodiments a command and control system may be equipped with firewall defense, communications, computers, cyber and/or other capabilities.

In one embodiment a system may comprise a complete package in a ruggedized, weather tight, hardened plastic shell, designed for front line transportability in even the toughest operating theaters, a set of wide screen, high-definition monitors (touchscreen or otherwise), an integrated, field replaceable x86 based PC workstation, mounting, power, and connectivity for field replaceable Mission Specific Equipment (MSE) such as tactical data radios or special purpose equipment, and an integrated UPS and a single power input for the entire unit, allowing for operation in challenging power environments. Specifications may vary and could include, for example, Intel Core Series CPU, up to Core i9, up to 32 GB of RAM, up to 2 TB of storage, up to 100 Gbps network connectivity, storable keyboard and mouse, pre-loaded software.

Figure 3:
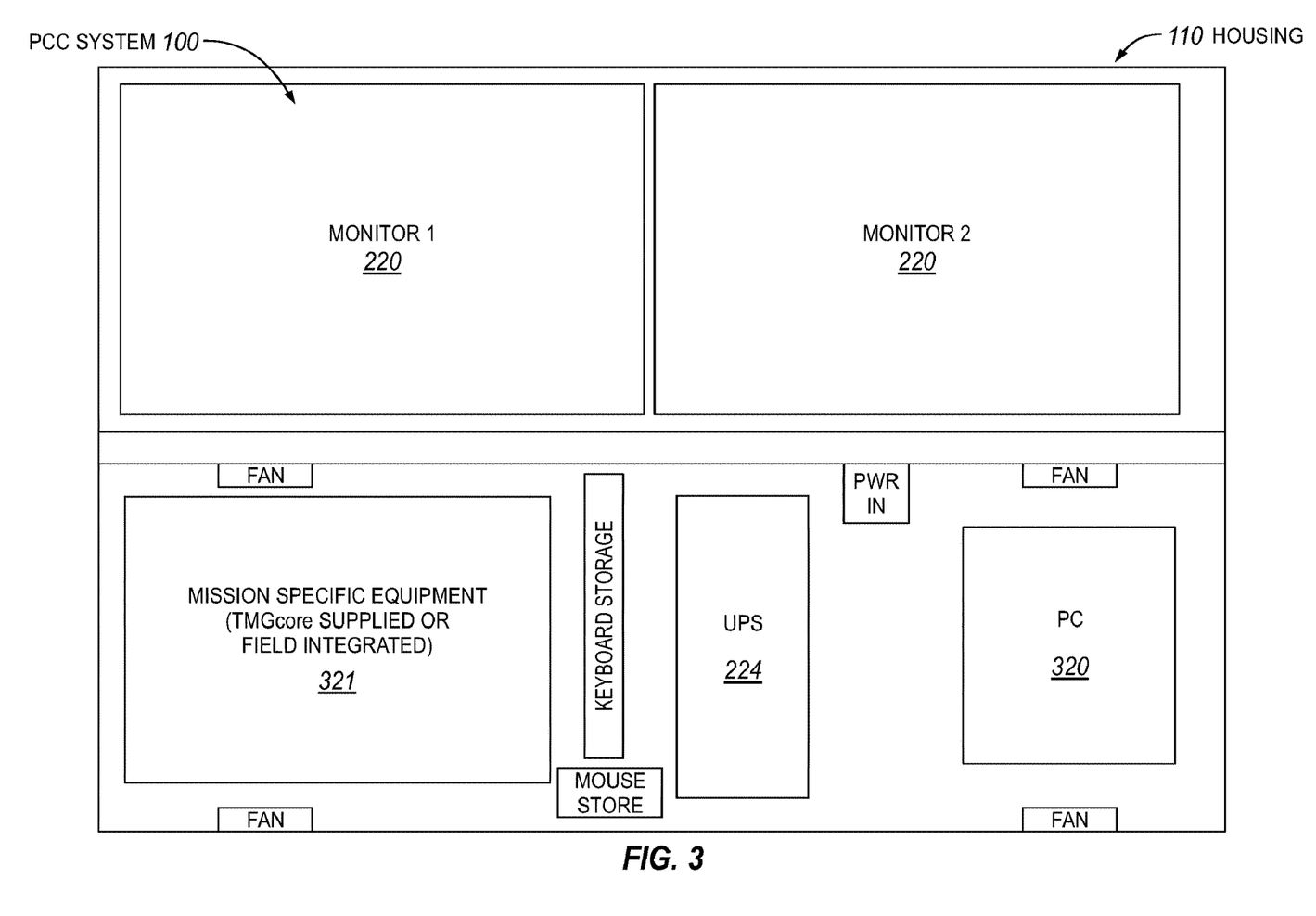
FIG. 3 shows exemplary equipment that can be installed in a PCC system according to an exemplary embodiment of the present disclosure.

FIG. 3 shows exemplary equipment that can be installed in a PCC system 100 according to an exemplary embodiment of the present disclosure. In this embodiment, two monitors 220 are configured to pop-up from the housing 110 to which they are movably attached. The monitors can be attached to a mount, which enables rotational movement of the monitors s. One or more fans are configured for thermal management. A personal computer 320 or laptop can be placed within the housing 110 and a UPS 224 may power the components of the system. In one example, optional mouse or keyboard storage is included. There may be space within the housing to include mission specific equipment 321.

Figure 4:
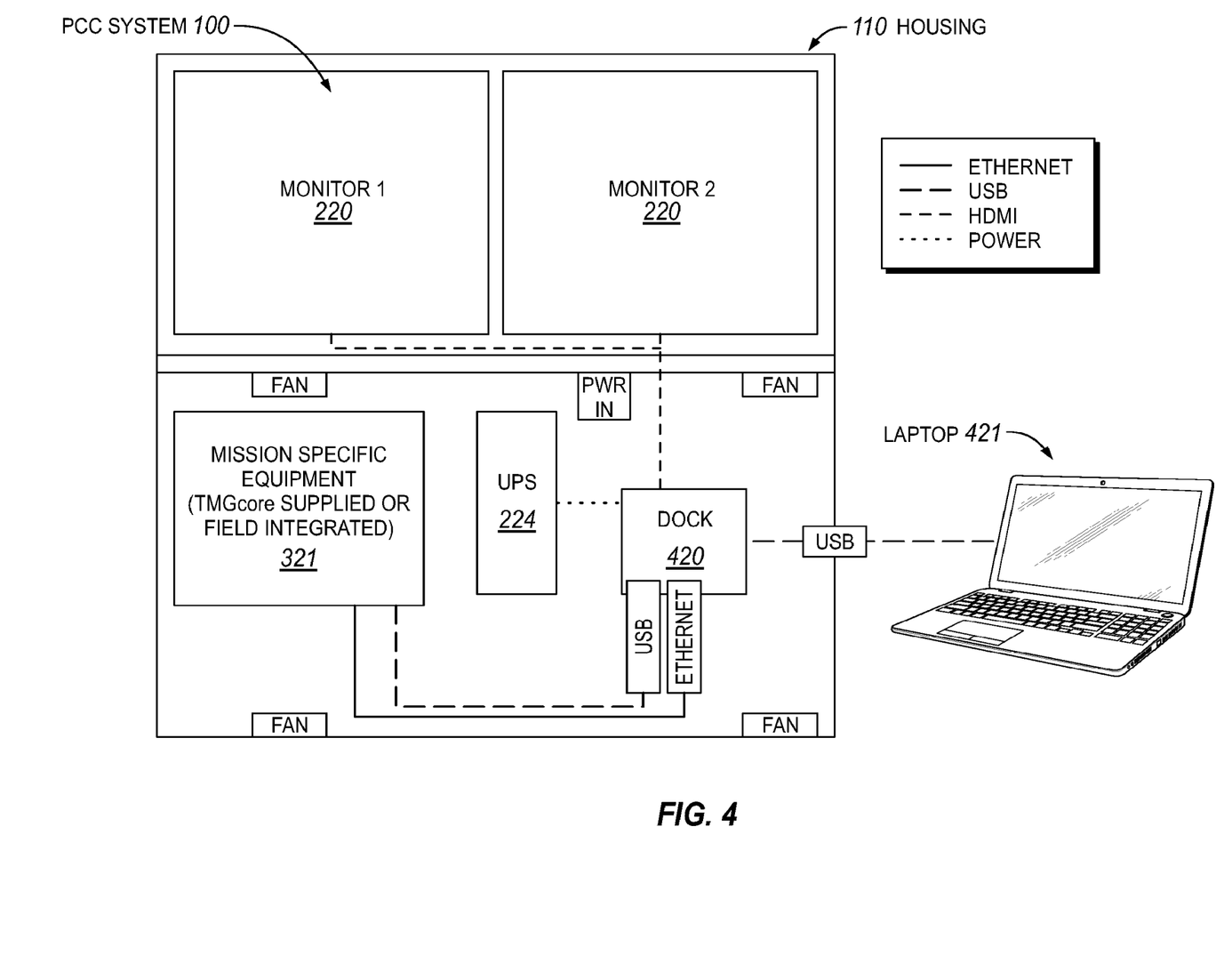
FIG. 4 shows another example embodiment of the PCC system.

FIG. 4 shows another example embodiment of the PCC system 100. In this example embodiment, a docking station 420 for connecting an external laptop 421 to the PCC system 100 is provided. In this example embodiment, the laptop 421 can be placed outside the housing 110. The laptop 421 can be connected to the monitors 220 using the docking station 420.

Figure 5:
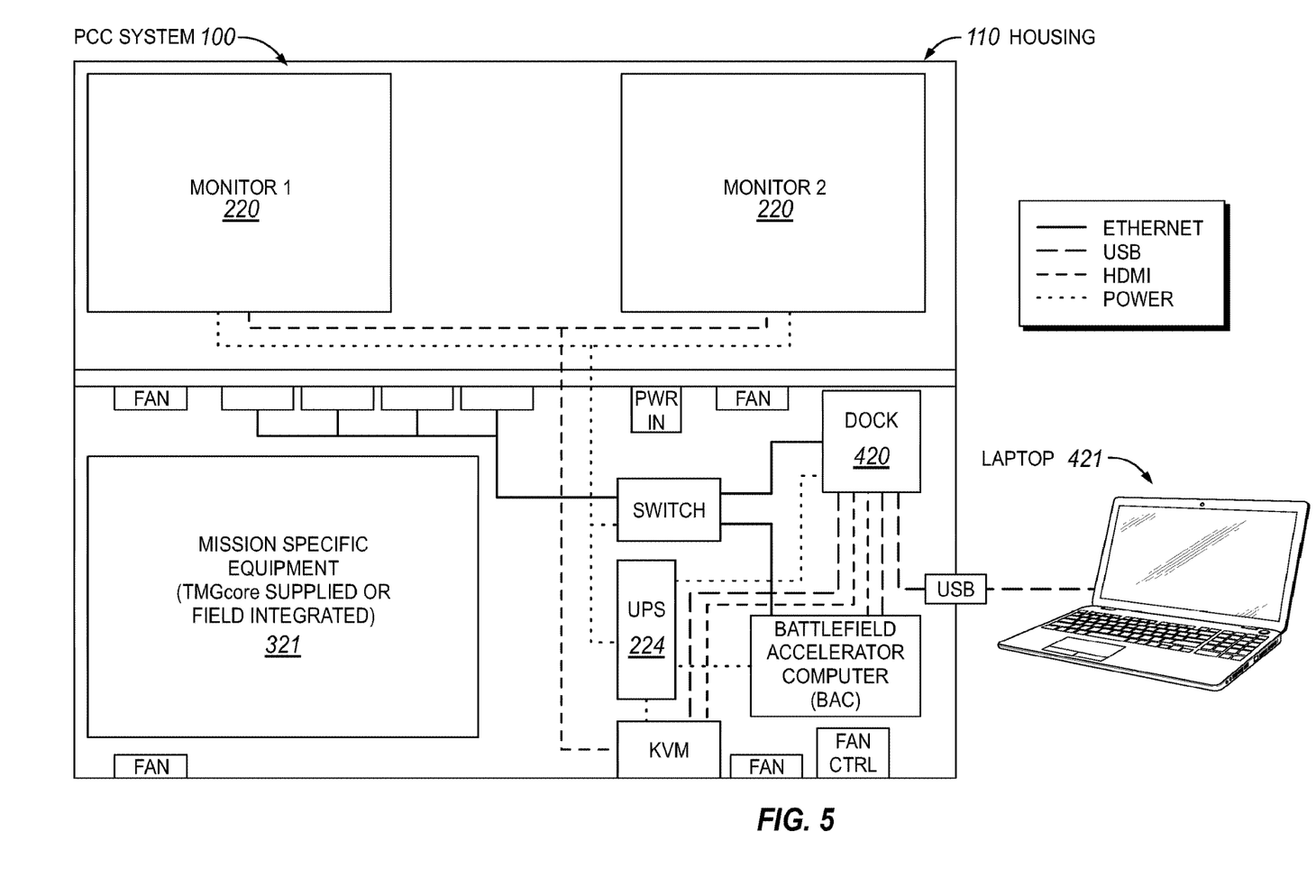
FIG. 5 shows yet another example embodiment of the PCC system.

FIG. 5 shows yet another example embodiment of the PCC system 100. In this example embodiment, the PCC system 100 is configured to have the capability of serving as a hub and be connected to one or more other mobile command and control systems. In some embodiments, this configuration can offer command, control, communications, computers and cyber applications.

Figure 6:
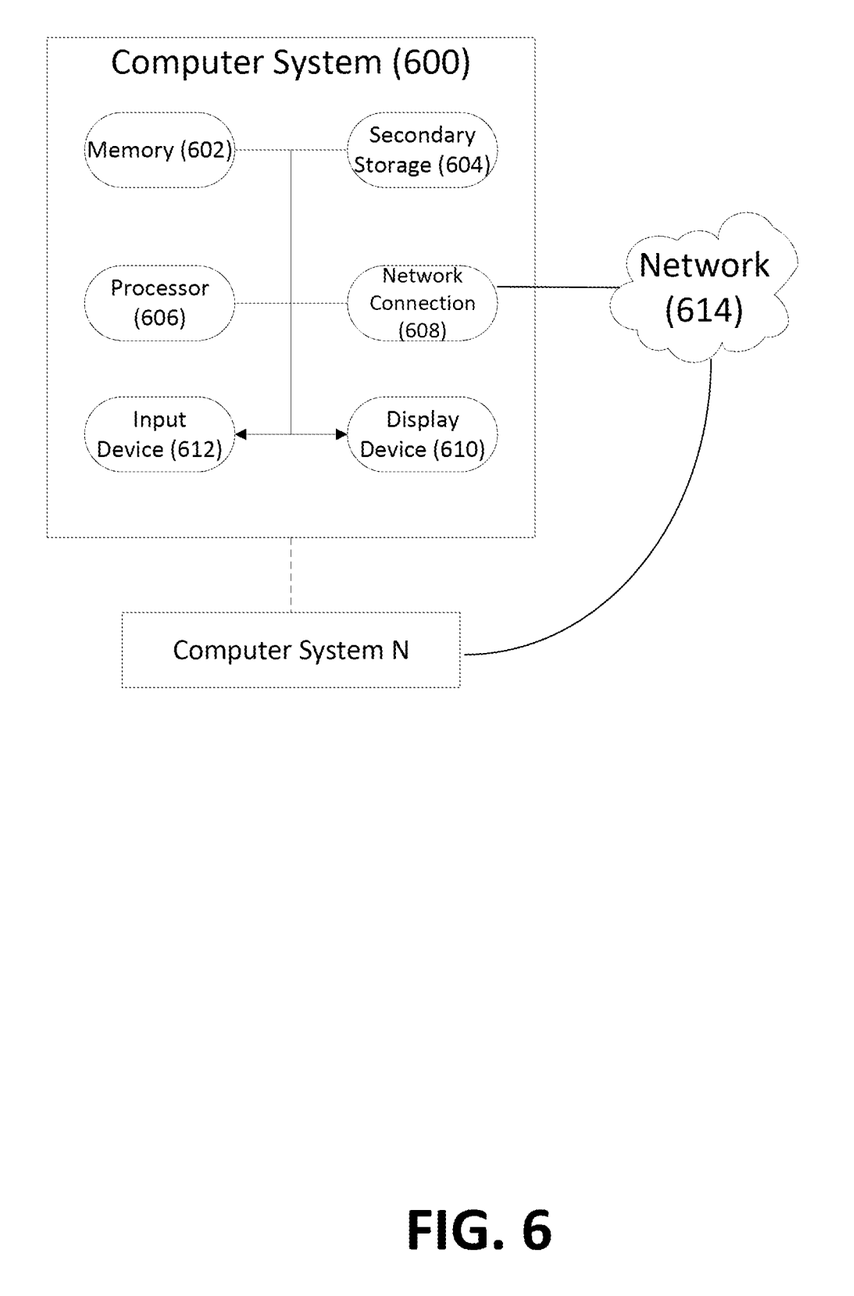
FIG. 6 illustrates exemplary hardware components of a PCC system.

FIG. 6 illustrates exemplary hardware components of a PCC system 100. A computer system 600 (or PCC system 100), or other computer systems similarly configured, may include and execute one or more subsystem components to perform functions described herein, including the steps of various flow processes described above. Likewise, a mobile device, a cell phone, a smartphone, a laptop, a desktop, a notebook, a tablet, a wearable device, a server, etc., which includes some of the same components of the computer system 600, may run an application (or software) and perform the steps and functionalities described above. Computer system 600 may connect to a network 614, e.g., Internet, or other network, to receive inquiries, obtain data, and transmit information and incentives as described above.

The computer system 600 typically includes a memory 602, a secondary storage device 604, and a processor 606. The computer system 600 may also include a plurality of processors 606 and be configured as a plurality of, e.g., bladed servers, or other known server configurations. The computer system 600 may also include a network connection device 608, a display device 610, and an input device 612.

The memory 602 may include RAM or similar types of memory, and it may store one or more applications for execution by processor 606. Secondary storage device 604 may include a hard disk drive, floppy disk drive, CD-ROM drive, or other types of non-volatile data storage. Processor 606 executes the application(s), such as those described herein, which are stored in memory 602 or secondary storage 604, or received from the Internet or other network 614. The processing by processor 606 may be implemented in software, such as software modules, for execution by computers or other machines. These applications preferably include instructions executable to perform the system and subsystem component functions and methods described above and illustrated in the FIGS. herein. The applications preferably provide graphical user interfaces (GUIs) through which users may view and interact with subsystem components.

The computer system 600 may store one or more database structures in the secondary storage 604, for example, for storing and maintaining the information necessary to perform the above-described functions. Alternatively, such information may be in storage devices separate from these components.

Also, as noted, processor 606 may execute one or more software applications to provide the functions described in this specification, specifically to execute and perform the steps and functions in the process flows described above. Such processes may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the computer system 600.

The input device 612 may include any device for entering information into the computer system 600, such as a touch-screen, keyboard, mouse, cursor-control device, microphone, digital camera, video recorder or camcorder. The input and output device 612 may be used to enter information into GUIs during performance of the methods described above. The display device 610 may include any type of device for presenting visual information such as, for example, a computer monitor or flat-screen display (or mobile device screen). The display device 610 may display the GUIs and/or output from sub-system components (or software).

Examples of the computer system 600 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 600 is shown in detail, system 600 may use multiple computer systems or servers as necessary or desired to support the users and may also use back-up or redundant servers to prevent network downtime in the event of a failure of a particular server. In addition, although computer system 600 is depicted with various components, one skilled in the art will appreciate that the system can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM.

The computer-readable media may include instructions for controlling the computer system 600, to perform a particular method, such as methods described above.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A portable command and control center system comprising:
   a waterproof, hardened, latchable two-piece plastic shell; and
   command and control components housed within the two-piece plastic shell;
   wherein the command and control components comprise:
      an uninterruptable power supply configured to power the system;
      at least two monitors that are configured to pop up into a position when the waterproof, hardened, latchable two-piece plastic shell is unlatched;
      a sensor for detecting an electromagnetic pulse; and
      processing circuitry for receiving a signal form the sensor, wherein the processing circuitry is configured to generate an alarm when the signal deviates from a threshold value.

2. The system of claim 1, further comprising a personal computer.

3. The system of claim 1, further comprising a docking station for connecting one or more laptop computers to the system.

4. The system of claim 1, further comprising an alarm device, wherein the alarm device is a speaker or a light.

5. The system of claim 4, wherein generating the alarm will cause the alarm device to make a sound or illuminate.

6. The system of claim 1, wherein the processing circuitry is configured to determine a strength, a frequency or a direction of the electromagnetic pulse.

7. The system of claim 1, further comprising a conductive color over the waterproof, hardened, latchable two-piece plastic shell.

8. The system of claim 1, further comprising a metallic layer over or within the waterproof, hardened, latchable two-piece plastic shell.

9. The system of claim 1, further comprising a door on the waterproof, hardened, latchable two-piece plastic shell.

10. The system of claim 9, wherein the door is configured to operate in two modes of operations, a first mode being open and a second mode being closed.

11. The system of claim 10, wherein in the open mode, electromagnetic waves can enter and exit the waterproof, hardened, latchable two-piece plastic shell.

12. The system of claim 1, wherein the at least two monitors are attached to a mount configured to provide for movement of the at least two monitors in at least two degrees of freedom.

* * * * *